Figure 5:
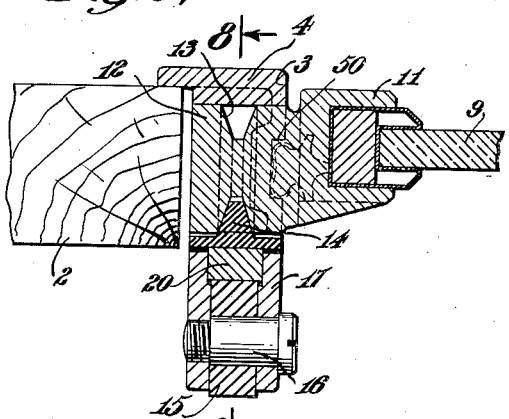

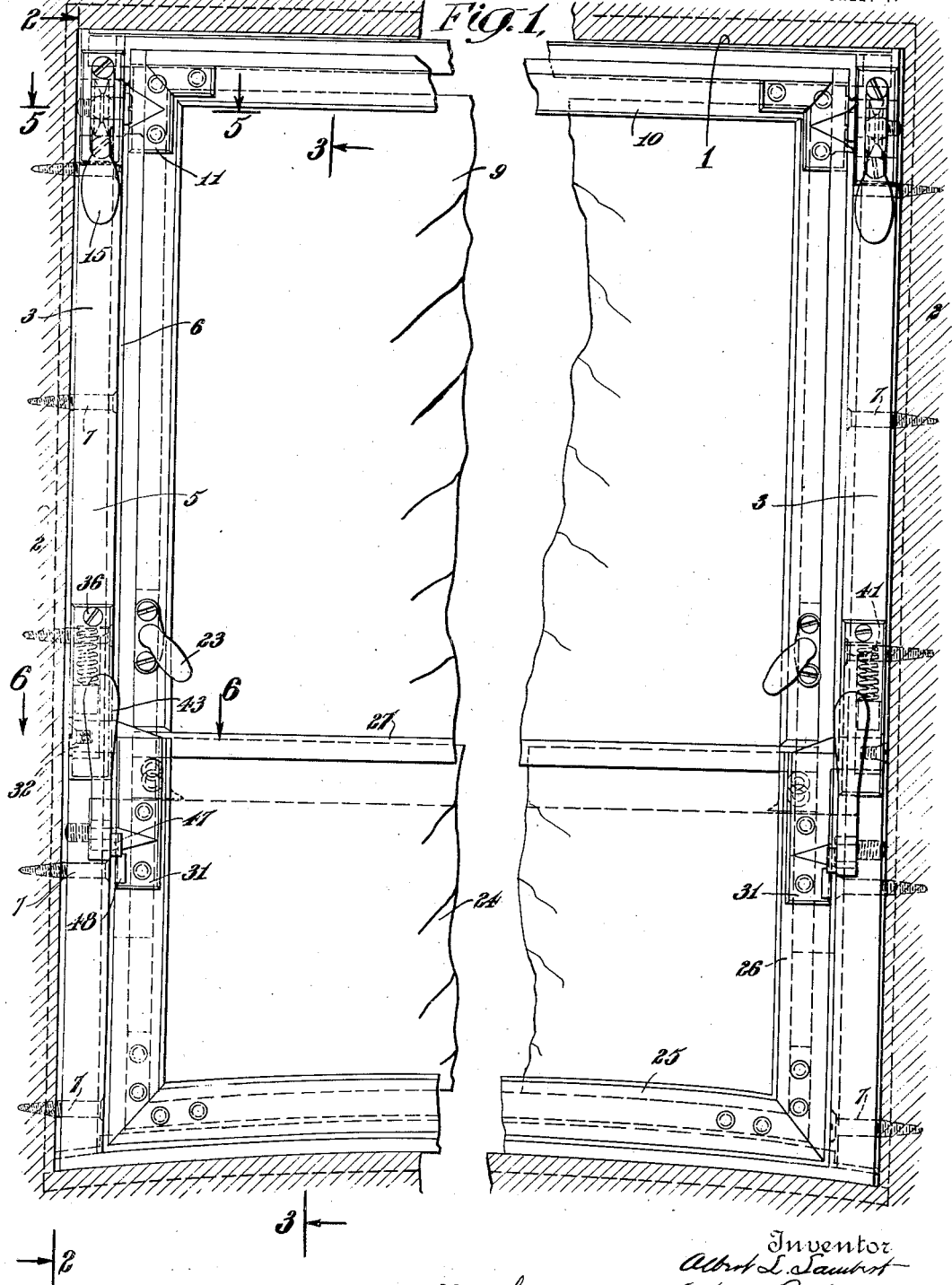

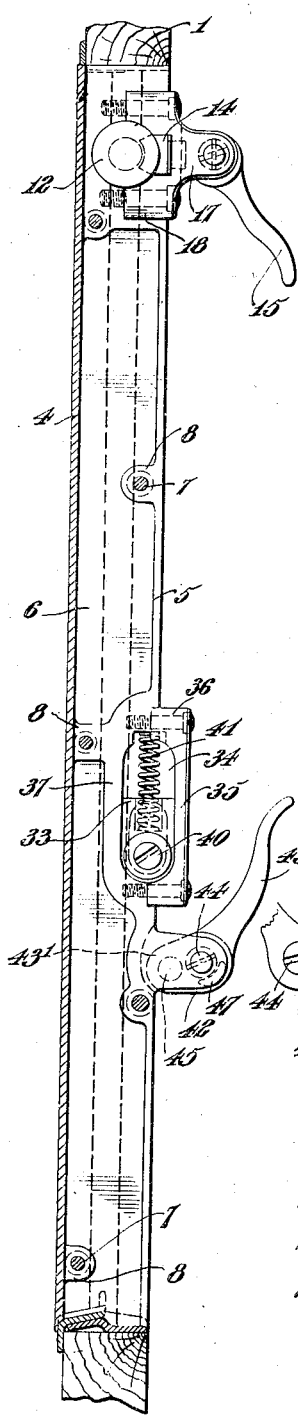
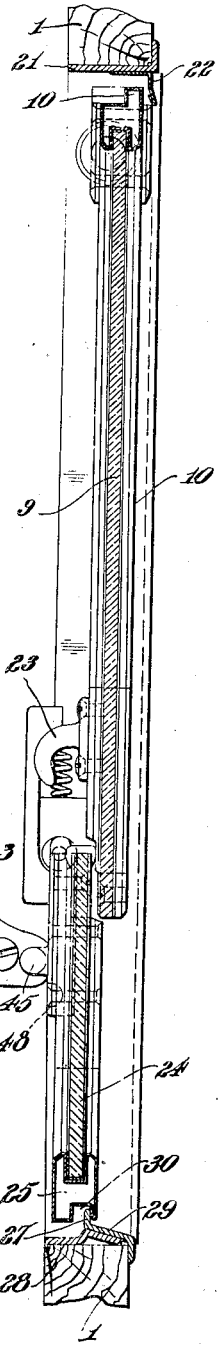
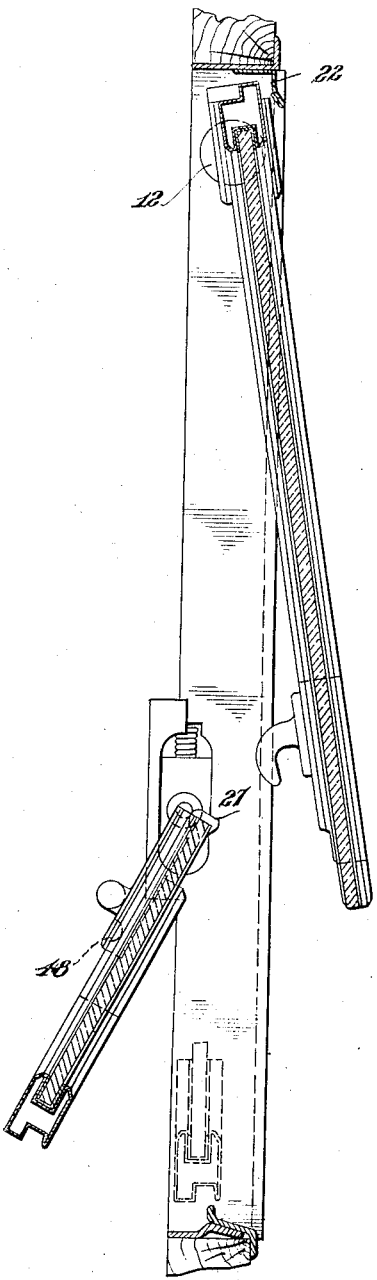

A. L. LAMBERT AND A. BELL.
WINDSHIELD.
APPLICATION FILED JAN. 29, 1920.

1,389,145.

Patented Aug. 30, 1921.

3 SHEETS—SHEET 3.

Inventor
Albert L. Lambert
Alfred Bell
By their Attorney
J. T. Edmonds

UNITED STATES PATENT OFFICE.

ALBERT L. LAMBERT, OF NARBETH, AND ALFRED BELL, OF PHILADELPHIA, PENNSYLVANIA, ASSIGNORS, BY MESNE ASSIGNMENTS, TO AMERICAN MOTOR BODY COMPANY, OF DETROIT, MICHIGAN, A CORPORATION OF DELAWARE.

WINDSHIELD.

1,389,145.    Specification of Letters Patent.    Patented Aug. 30, 1921.

Application filed January 29, 1920. Serial No. 354,834.

*To all whom it may concern:*

Be it known that we, ALBERT L. LAMBERT, residing at Narbeth, in the county of Montgomery and State of Pennsylvania, and ALFRED BELL, residing at Philadelphia, in the county of Philadelphia, in the State of Pennsylvania, both citizens of the United States, have invented certain new and useful Improvements in Windshields, of which the following is a specification.

Our invention relates to an improved form of wind shield construction for automobiles, particularly those having closed bodies. The object of our invention is to produce a construction which will be extremely efficient in operation, readily manufactured in large quantities and easily and accurately mounted in place and which will have various improved details of construction and combinations of parts.

The construction is particularly adapted, as stated, for use in connection with automobiles having closed bodies. When so used a pair of upright members are provided which are rigidly secured within the right and left sides of the wind shield opening in the automobile body. These side frame members are of improved construction and are designed to take up variations in the opening and to make manufacturing more convenient.

Upper and lower wind shields are pivotally mounted between the side frame members referred to so that the same will close in vertical positions and may be opened by swinging each of the same at an angle to the vertical. One of the features of our invention relates to the mounting of the lower wind shield. This is so arranged that movement of a pair of hand levers, which are pivoted to the frame members at both sides, results in first raising the wind shield slightly so as to cause the lower edge of the same to clear a bottom rail, after which a continuance of the movement of the hand levers results in swinging the lower edge of the wind shield inwardly of the automobile. This may be accomplished by providing the upper side edges of the shield with a pair of trunnions which are adapted to slide up and down in guide-ways on the side frame members. The hand levers have pivotal connections with the wind shield which are so positioned as to effect the movement described. At the end of the movement of the hand levers the pivotal connections between the levers and the shield cross the lines connecting the pivots of the levers and the sliding upper trunnions referred to. This results in the open position of the shield being a position of stable equilibrium, the weight of the shield tending to hold the same in this position. Spring means are also preferably used to press downwardly upon the sliding trunnions so as to aid in holding the shield firmly in its open and closed positions and thereby prevent rattling.

Another particular feature of our invention relates to the use of a continuous wiping strip of rubber or the like on the face of each of the side frame members, these strips extending continuously from the bottom of the opening to a point adjacent the top thereof. These strips are adapted to engage the side edges of both wind shields to make a tight construction when the shields are closed. Preferably the strips are so formed as to make contact with each shield at two separated points in different planes so as to make the shields doubly tight.

Figure 6:
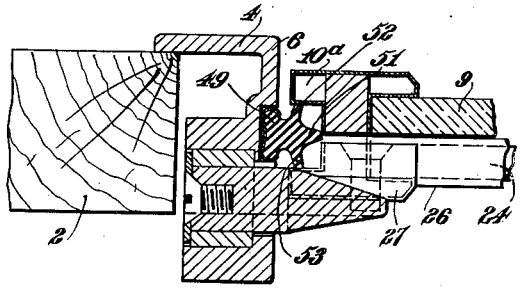
Figure 7:
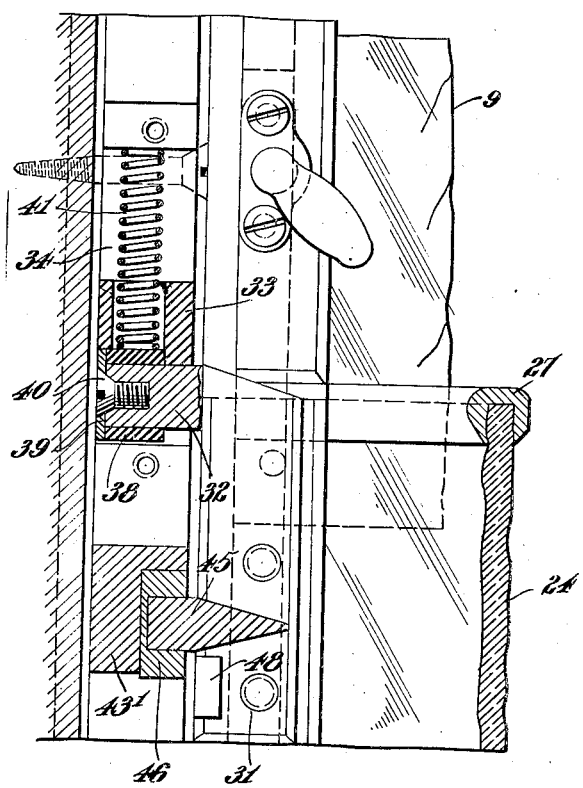
Figure 8:
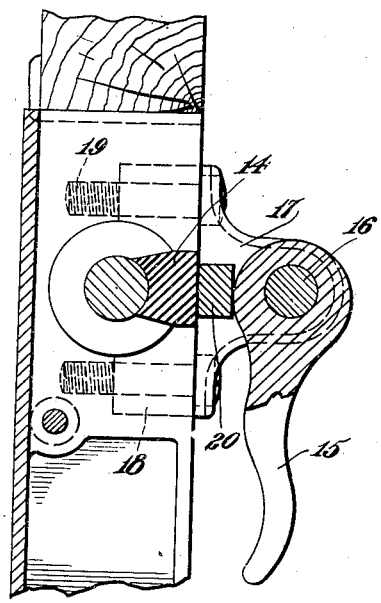

In order that our invention may be more clearly understood, attention is hereby directed to the accompanying drawings forming part of this invention and illustrating one embodiment of our invention. In the drawings, Figure 1 represents a front elevation of a construction embodying our invention mounted within the wind shield opening in a closed automobile, as viewed from the inside of the automobile, Figs. 2 and 3 are vertical sections taken respectively on lines 2—2 and 3—3 of Fig. 1, Fig. 4 is a view similar to that shown in Fig. 3, but with the wind shields in open position, Figs. 5 and 6 are respectively horizontal sections taken on lines 5—5 and 6—6 of Fig. 1, Fig. 7 is an enlarged view partly in front elevation and partly in section of a detailed construction shown in Fig. 1 and Fig. 8 is a section taken on line 8—8 of Fig. 5.

Referring to the drawings, the front 1 of the body of a closed automobile has an opening formed therein which is bounded at the sides by the portions 2, 2 of the body member 1.

Side frame members 3, 3 are provided and are adapted to be secured within the opening against the portions 2, 2 of the body at the sides of the opening. The side frame members 3, 3 may be described as generally channel-shaped in cross-section, the sections of the members varying, however, at different points in the height of the same. Members 3 are provided with flanges 4 which are adapted to overlap the body members 2 at the front of the opening. Flanges 5 are provided, parallel to flanges 4, adjacent the inner edges of the openings, and flanges, or more properly speaking, web portions 6, connect outside and inside flanges 4 and 5 and extend parallel to the edge surfaces of members 2, 2 but spaced inwardly of the opening, somewhat therefrom.

Members 3, 3 are rigidly secured in position within the opening by appropriate means such as screws 7, 7 which extend through the inside flange 6 of each member 3 and into the body portion 2 of the automobile. Various lugs 8, 8, may be provided in members 3, parallel to and adjacent the edges of the opening in body portions 2, to receive and guide the screws 7.

The upper wind shield is provided with the usual glass panel 9 which is received in a suitable marginal frame 10. This is pivotally mounted adjacent its upper side edges, within the side frames 3, 3. Preferably, trunnion members are provided having L shaped flange portions 11 which are secured to the inner and outer faces of the sash or frame 10 at the upper corners thereof. Trunnions 12 are formed integral with the webs 11' connecting members 11 and are received within suitable seats in side frame members 3.

Each of the trunnions has a groove 13 turned therein. A wedge shaped block 14 is mounted in position to fit within this groove. A hand lever 15 is pivotally mounted on a pin 16 which is mounted in a pair of ears 17 between which lever 15 extends. Ears 17 are formed on a cap member 18 which is secured to member 3 by suitable means such as the screws 19. Cap member 18 provides one-half the bearing for the trunnions 12, the other half of the bearing being provided in the member 3.

Hand levers 15 are mounted eccentrically on their pivots 16 or are provided with cam surfaces, so that depressing the hand levers will cause the same to press the wedge blocks 14 into the grooves 13, the spacing blocks 20 being provided between the cam levers and blocks 14. The upper wind shield may readily be clamped either in its vertical, closed position, or in any position of oscillation of trunnions 12 within their bearings by the operation of clamping levers 15.

Preferably, the upper edge of the opening in the automobile body is provided with an angle plate 21 on which an angular member 22 may be secured to overlap the upper flange of the top rail 10 of the upper wind shield, to render the same approximately air tight at this point. Finger-pieces 23 may be provided on the side rails or frame members of the wind shield to aid in opening and closing the same.

The lower wind shield is provided with a glass panel 24 which is received within a marginal frame, the bottom portion of the same being shown at 25 and the side portions being indicated at 26 (Fig. 6). The upper and lower wind shields are adapted to extend in parallel planes, when closed, with the upper edge of the lower shield and the lower edge of the upper shield overlapping. The upper edge of the lower glass 24 is provided with a rubber guard 27' which is adapted to engage against the surface of the upper glass 9, when both shields are closed.

The bottom of the opening in the automobile body is preferably provided with an upwardly extending flange 27, midway the distance between the front and rear surfaces of the body member 1. This is preferably provided by mounting a bent metallic member 28 on the bottom surface of the opening and securing an angular member 29 upon that, member 29 having the upwardly extending flange 27 referred to. Flange 27 is adapted to engage within a channel 30 on the under side of the bottom rail 25 of the lower wind shield, when the latter is seated in closed position.

The means for mounting the lower wind shield will now be described. Members 31, 31 secured to the side frames 26 of the lower wind shield have pivot pins or trunnions 32 extending laterally outwardly therefrom. Pivot pins 32 are rotatably mounted within blocks 33 which are adapted to slide in the vertical guide-ways in side members 3. These guide-ways, indicated at 34, are preferably formed by providing cap pieces 35 which are secured by screws 36 to the members 3. Members 3 have the inside flanges 5 thereof bent to provide seat portions 37, one-half of each guideway 34 being provided by the recesses thus formed in flange 5 and the other half of the guide-way being formed by suitably shaping the inside surface of cap piece 35.

A short sleeve 38 is preferably positioned about each pivot pin 32 within sliding block 33, the sleeve being held in place by a washer 39 which is secured to the end of pin 32 by a screw 40. The upper portion of block 33 is bifurcated, or provided with a recess, in which the lower end of a spiral spring 41 is mounted, the upper end of the spring being seated against the upper surface of the guide-way 34. These springs press downwardly upon pivots 32 and accordingly aid in holding the wind shield firmly seated upon flange 27 at the bottom of the opening without rattling, when the shield is in closed position. If desired, sleeve 38 may be omitted, pivot pin 32 being rotatably mounted directly in block 33.

The inside flange 5 of each member 3 is provided with a lug 42 extending inwardly, that is, rearwardly of the automobile, a short distance below the seat portion 37 of flange 5. Hand levers 43 are pivoted to lugs 42 by means of pivot pins 44. These levers are provided with tail portions 43' which are pivotally connected with the wind shield. This is accomplished by providing the members 31 which are secured to the wind shield, with pivot pins 45 the ends of which are pivotally mounted within the tails of the levers, the tails of the levers preferably being provided with bearing members 46.

It will be noted that the pivot pins 45 are slightly below pivots 44 when the shield is in its lower closed position. When hand levers 43 are depressed the first part of the movement of pins 45 from slightly below the horizontal center line of pivots 44 to slightly above such center line serves to lift the shield in an almost vertical plane, or until the bottom flange of the frame 25 at the bottom of the shield has cleared stationary flange 27. Upon continuing the downward movement of levers 43 the pins 45 swing upwardly toward the rear, so that the bottom edge of the shield swings rearwardly, that is, inwardly of the automobile, the shield swinging about pivot pins 32 as the latter move upwardly with sliding blocks 33.

When, however, in the continuance of this movement, the pins 45 cross the center lines connecting pivots 44 and 32, sliding members 33 stop rising and begin to descend. When this takes place, fixed stops 47 come into contact with suitable seats 48, formed on members 31 which are secured to the frame of the wind shield. This provides a definite stop for the shield in its opened position, this being a position of stable equilibrium. The weight of the wind shield and also the pressure of springs 41 serve to firmly hold stops 47 in contact with their seats 48 and to prevent rattling of the wind shield.

When the wind shield is to be returned to its closed position hand levers 43 may be raised whereupon the shield will be returned through the same path. It is not necessary, however, to close the shield by means of the hand levers since, with the various pivotal points located in the manner described and illustrated, it is only necessary to push against the shield with the hand from inside the automobile. This results in the shield following the same course as if the hand levers were raised, pivot pins 32 first rising slightly and then descending until the shield reaches its closed position.

Another feature of our invention, as stated, relates to the means by which the shields are kept tight while in their closed position. A single strip 49, preferably formed of molded rubber, is secured to the face of each member 3 and extends continuously from the bottom of the member 3 to the underneath side of the upper trunnion 12. Preferably each member 3 has a channel shaped recess 50 formed in the face of the web 6 thereof, the strip 49 being secured to member 3 within this recess. The strip is so positioned and so formed as to make a wiping contact with each of the wind shields when the latter are in closed position. Preferably the strip is provided with several projections thereon, one of which, 51, is directed away from the flange 6, that is inwardly of the opening. This flange makes wiping contact with the adjacent edges of both the upper and lower shields where they overlap, and with the upper shield above this point and with the lower shield below this point. Strip 49 is also provided with flanges 52 and 53 which extend at an angle toward the outside and the inside of the automobile respectively. The side rail of the upper wind shield is provided with a flange $10^a$ which is directed toward the flange 6 of member 3. The side rail 26 of the lower wind shield is provided with a similar flange and flanges 52 and 53 of the wiping strip 49 make contact with these flanges when the shields are in their closed position. It will thus be noted that a pair of contact points are provided for each shield, these contact points being in different planes so as to make both shields doubly tight.

It should be noted that our invention is not limited strictly to the exact details of construction described but that the same is as broad as is indicated by the accompanying claims.

What we claim is:—

1. In a wind shield, the combination of fixed side frame members having guideways, a wind shield having pivots thereon mounted for sliding movement in said guideways, levers pivoted on said frame members and having pivotal connections with said shield, the pivotal points being so located that the operation of said levers in one direction raises said shield and said first named pivots and swings said shield at an angle to the vertical about said first named pivots.

2. In a wind shield, the combination of fixed side frame members having guideways, a wind shield having pivots thereon mounted for sliding movement in said guideways, levers pivoted on said frame members and having pivotal connections with said shield, and a seat for said shield in its closed vertical position, the locations of the various pivotal points being such that operation of said levers first moves said shield approximately vertically from said seat and then swings the same at an angle to the vertical about said first named pivots.

3. In a wind shield, the combination of fixed side frame members having guideways, a wind shield having pivots thereon slidably mounted in said guideways, hand levers pivoted to said frame members, connections between said levers and shield such that rotation of said levers in one direction first raises the shield, then swings the same about said first named pivots, and then tends to draw said first named pivots downwardly, and seats engaged by said levers at the end of such movement.

4. In a wind shield, the combination of fixed side frame members having guideways, a wind shield having pivots thereon mounted in said guideways, hand levers pivoted to said frame members, connections between said levers and shield such that rotation of said levers in one direction first raises the shield, then swings the same about said first named pivots, and then tends to draw said first named pivots downwardly, seats engaged by said levers at the end of such movement, and springs tending to depress said first named pivots.

5. In a wind shield, the combination of fixed side frame members, vertically slidable members thereon, a wind shield pivotally connected at its upper side edges with said vertically slidable members, levers pivoted on said fixed frame members and having tail portions and pivotal connections between the tails of said levers and said shield, the positions of the various pivotal points being such that operation of said levers first lifts said shield vertically from its bottom, closed, position and then swings the same about its pivotal connections with said vertically slidable members.

6. In a wind shield, the combination of fixed side frame members having guideways, a wind shield having pivots thereon slidably mounted in said guideways, levers pivoted on said frame members and having pivotal connections with said shield and a seat for said shield in its closed vertical position, the locations of the various pivotal points being such that operation of said levers first lifts said shield and then swings the same at an angle to the vertical about said first named pivots into a position of stable equilibrium, and a seat against which one of the moving parts engages in said last named position.

7. In a wind shield, the combination of fixed side frame members having guideways, a wind shield having pivots thereon mounted in said guideways, levers pivoted on said frame members and having tail portions, the pivots of said levers being lower than said first named pivots, pivotal connections between said lever tail portions and said shield, a seat for said shield in its lower closed position, said pivotal points being so located that operation of said levers raises said shield and then swings the same about said first named pivots while said last named pivotal connections rise, swing toward lines connecting said first named pivots with the pivots of said levers, and then cross such lines, and seats engaged by said levers when said last named pivotal connections have crossed such lines.

8. In a wind shield, the combination of fixed side frame members having guideways, a wind shield having pivots thereon slidably mounted in said guideways, said shield having a lower, closed vertical position and a vertically raised, open inclined position, seats engaged by moving parts of the construction in both positions, means manually movable in one direction to move said shield from its closed to its open position, and spring means positioned to press said moving parts against said seats in both positions.

This specification signed and witnessed this 22nd day of January, 1920.

ALBERT L. LAMBERT.
ALFRED BELL.

Witnesses:
WILLIAM J. KINDREGAN,
WILLIAM J. EARNSHAW.